(12) United States Patent
Ishii et al.

(10) Patent No.: US 7,288,610 B2
(45) Date of Patent: Oct. 30, 2007

(54) METHOD OF POLYMERIZATION AND NOZZLE EMPLOYED IN SAME

(75) Inventors: Taisuke Ishii, Mie (JP); Yoshiaki Mori, Mie (JP); Shunichi Himori, Mie (JP); Kiichi Itoh, Mie (JP)

(73) Assignee: Mitsubishi Chemical Corporation, Tokyo (JP)

(*) Notice: Subject to any disclaimer, the term of this patent is extended or adjusted under 35 U.S.C. 154(b) by 220 days.

(21) Appl. No.: 10/953,620

(22) Filed: Feb. 2, 2004

(65) Prior Publication Data
US 2005/0119424 A1 Jun. 2, 2005

Related U.S. Application Data

(63) Continuation of application No. PCT/JP02/07173, filed on Jul. 15, 2002.

(30) Foreign Application Priority Data

| Jul. 31, 2001 | (JP) | ............................. 2001-230822 |
| Jul. 31, 2001 | (JP) | ............................. 2001-230823 |

(51) Int. Cl.
*C08F 2/34* (2006.01)
*C08F 20/00* (2006.01)
*B05B 1/02* (2006.01)

(52) U.S. Cl. .................. 526/88; 526/306; 526/915; 526/919; 239/423; 239/424

(58) Field of Classification Search .................. 526/88, 526/919, 306, 915; 239/399, 421, 423, 424
See application file for complete search history.

(56) References Cited

U.S. PATENT DOCUMENTS

| 4,735,359 A | 4/1988 | Demyanovich |
| 4,788,011 A | 11/1988 | Busse et al. |
| 6,107,358 A | 8/2000 | Harada et al. |
| 6,221,260 B1 * | 4/2001 | Chahine et al. ............. 210/748 |
| 6,399,730 B1 * | 6/2002 | Freeman et al. ............ 526/310 |

FOREIGN PATENT DOCUMENTS

| JP | 54-139986 A | 10/1979 |
| JP | 58-34811 A | 3/1983 |
| JP | 01-49330 B2 | 10/1989 |
| JP | 3028202 A | 2/1991 |
| JP | 05-132503 A | 5/1993 |
| JP | 06-211904 A | 8/1994 |
| JP | 7-309903 A | 11/1995 |
| JP | 8-208747 A | 8/1996 |
| JP | 9-255704 A | 9/1997 |
| JP | 10-251310 A | 9/1998 |
| JP | 11-049805 A | 2/1999 |
| JP | 11093073 A | 4/1999 |
| JP | 2000-198805 | 7/2000 |
| JP | 2001-025689 A | 1/2001 |

OTHER PUBLICATIONS

English language translation of JP 5-132503-A, publication date: May 28, 1993.*
Kobayasi, Kiyosi, Transactions of the Japan Society of Mechanical Engineers. 1951, vol. 17, No. 58, 114-118.
Kobayasi, Kiyosi, Transactions of the Japan Society of Mechanical Engineers, 1951, vol. 17, No. 58, 112-114.
Tanasawa, et al., Transactions of the Japan Society of Mechanical Engineers. 1951, vol. 17, No. 58, 107-111.
Briens, et al., "Development of an Ultra-rapid Reactor for Superabsorbent Polymer", Ind. Eng. Chem. Res. 2001, vol. 40, 5386-5390.
Kobayasi, Kiyosi, "Atomizing Characteristics of Swirl Injection Nozzle (Supplement of $2^{nd}$ Report, The Effect of the Dimensions of the Swirl Chamber on the Coefficient of Discharge, the Spray Angle and the Size of Drop", Transactions of the Japan Society of Mechanical Engineers. 1953, vol. 19, No. 80 56-59.
Kobayasi, Kiyosi, "Atomizing Characteristics of Swirl Injection Nozzle ($3^{rd}$ Report, The Effect of the Physical Properties of Liquid on the Coefficient of Discharge)", Transactions of the Japan Society of Mechanical Engineers. 1953, vol. 19, No. 80, 60-64.
Kobayasi, Kiyosi, "Atomizing Characteristics of Swirl Injection Nozzle ($4^{th}$ Report, The Effect of the Physical Properties of Liquid on the Spray Angle of theh Size of the Drop)", Transactions of the Japan Society of Mechanical Engineers. 1953, vol. 19, No. 80, 64-68.
Kobayasi, Kiyosi, Transactions of the Japan Society of Mechanical Engineers. 1951, vol. 17, No. 58, 114-118.
Kobayasi, Kiyosi, Transactions of the Japan Society of Mechanical Engineers. 1951, vol. 17, No. 58, 112-114.
Lefebvre, Arthur, *Atomization and Sprays*, "Basic Processes in Atomization", Chp.2, "Atomizers", Chp. 4, 1989. 27-78, 105-153.
Tanasawa, et al., "On the Theory of Viscous Swirl", Transactions of the Japan Society of Mechanical Engineers. 1952, vol. 18, No. 77, 37-41.
Tanasawa, et al., Transactions of the Japan Society of Mechanical Engineers, 1951, vol. 17, No. 58, 107-111.
Zhang, et al., "The Spray Structure from Swirl Atomizers ($1^{st}$ Report, General Characteristics and Structure of a Spray of a Swirl Atomizer)", Transactions of the Japan Society of Mechanical Engineers. 1994. vol. 60, No. 570, 675-680.
Zhang, et al., "The Spray Structure from Swirl Atomizers ($2^{nd}$ Report, Correlation between Characteristics of Swirl Atomizers and Structure of Spray)", Transactions of the Japan Society of Mechanical Engineers. 1994, vol. 60, No. 570, 681-686.
Zhang, et al., "The Spray Structure from Swirl Atomizers ($3^{rd}$ Report, Dimensionless Expression of Spray Characteristics)", Transactions of the Japan Society of Mechanical Engineers. 1994, vol. 60, 577, 3185-3191.

* cited by examiner

*Primary Examiner*—Fred Teskin
(74) *Attorney, Agent, or Firm*—Browdy and Neimark, PLLC

(57) ABSTRACT

A polymerization method in which a first liquid and a second liquid are mixed in a gas phase and polymerized in the form of droplets is disclosed, wherein a polymerizable monomer and a polymerization initiator are each contained in at least one of the first liquid and the second liquid, and at least one of the first liquid and the second liquid is injected in a spatially expanding film shape. By employing the polymerization method of this invention, high-quality polymer can be efficiently produced in large quantity by the droplet polymerization even using a polymerizable monomer with a rapid reaction rate.

14 Claims, 6 Drawing Sheets

METHOD OF POLYMERIZATION AND NOZZLE EMPLOYED IN SAME

FIELD OF THE INVENTION

The present invention relates to a method of polymerization and a nozzle for use in the same. More particularly, the present invention relates to a method of polymerization in which two liquids are mixed in a gas phase, and an improvement in the nozzle employed therein.

RELATED ART

Methods of droplet polymerization are known in which a liquid containing a polymerizable monomer and a liquid containing a polymerization initiator are mixed by injecting them into a gas phase to conduct polymerization. Droplet polymerization is a particularly effective method in the case of instantly occurring polymerization conducted by the contact of the polymerizable monomer with a polymerization initiator.

For example, water-absorbent polymers are produced by radical polymerization by contacting an aliphatic unsaturated carboxylic acid with a polymerization initiator. The radical polymerization may take place quite rapidly, depending on the polymerization initiators selected. Thus, water-absorbent polymers have generally been produced by solution polymerization or reverse-phase suspension polymerization. However, since the heat of polymerization is difficult to remove, the polymerization rate cannot be increased. Accordingly, the production of water-absorbent polymers with droplet polymerization, in which the heat of polymerization can be efficiently removed, has been proposed in recent years.

In droplet polymerization, the step of pulverization required in solution polymerization, the step of separating the water-absorbent polymer from the organic solvent required in reverse-phase suspension polymerization, or the step of recovering the organic solvent by distillation are not required. Further, depending on the conditions, since it is possible to employ some of the heat of polymerization to evaporate moisture contained in the water-absorbent polymer, droplet polymerization is highly advantageous with respect to the reduction of the energy load in the subsequent drying step. A further advantage is afforded by droplet polymerization in that water-absorbent composites can be quickly produced without handling powder by dropping the droplets mixed in a gas phase directly onto a fibrous substrate. In that process, water-absorbent composites with desired water absorbing capacity can be produced easily by adjusting the timing of the dropping and the speed of conveying the fibrous substrates. Thus, the droplet polymerization method can be employed to provide water-absorbent composites with high water absorbency and high water absorption speed, and with water-absorbent polymer particles immobilized well on a fibrous substrate (Japanese Unexamined Patent Publication (KOKAI) Heisei Nos. 9-67403 and 10-113556).

However, it is thought that in principle, it is difficult to efficiently produce large quantities of polymer with droplet polymerization method on the same scale as with solution polymerization method or reverse-phase polymerization method, because a first liquid and a second liquid are collided and mixed in a gas phase in droplet polymerization. FIG. 1 shows the droplet polymerization nozzle conventionally employed to produce water-absorbent polymer. Here, a first liquid (3) passes through a distribution pipe to five nozzles (1), a second liquid (4) passes through a distribution pipe to five nozzles (2), and the first and second liquids are injected out through the tips of the nozzles, collided each other, mixed, flow together, and drop while polymerization takes place.

The inner diameter of the nozzles is usually from 0.1 to 0.2 mm. If the inner diameter is large, mixing will be uneven and the quality of the water-absorbent polymer produced will be also uneven. Thus, the inner diameter cannot be excessively large for mass production. Accordingly, it is necessary to increase the number of the nozzles in order to produce large quantities of water-absorbent polymer with this type of nozzles. However, this is impractical due to an increase of the cost for installing the equipments. Further, it is necessary to precisely set the tips of the nozzles to ensure that the first and second liquids collide with each other after the injection. However, there are problems of a decline in production efficiency due to slight shifting of the nozzle tips and partial clogging of the nozzles in the long-term use.

As a countermeasure for such problems, a method employing slit nozzles shown in FIG. 2 has been proposed (Japanese Unexamined Patent Publication (KOKAI) Heisei 11-49805). In the figure, a first liquid (13) passes through a slit (15) at the end of the first liquid nozzle (11) and is injected as a liquid film. A second liquid (14) passes through another slit (16) at the end of the second liquid nozzle (12) and is injected as a liquid film. The two liquid films then flow together in a gas phase and drop while polymerizing. This method can be expected to improve efficiency in the production of water-absorbent polymer compared with the use of the opposed nozzles shown in FIG. 1.

However, the inventors have verified that when employing the slit nozzles, as the liquid films injected from the front ends of the slits (15, 16) flow down, the width thereof is reduced owing to surface tension. As the width of the liquid films narrows, the thickness of the liquid films becomes uneven. As the result of the collision of first and second liquids, both of which are nonuniform at the colliding point, the polymerization reaction is not uniform. Further after the mixing, the width of the liquid film also narrows as well owing to surface tension. Thus, the desired droplets cannot be generated and the diameters of the droplets are uneven.

Thus, high-quality polymer from rapidly reacting polymerizable monomer cannot be efficiently produced in large quantities with conventional droplet polymerization method.

Accordingly, the present invention aims at solving the problems of prior art stated above. That is, the present invention aims at providing a method of efficiently producing high-quality polymer in large quantities with droplet polymerization from rapidly reacting polymerizable monomer. Especially, the object is to produce more homogeneous polymer by preventing one of the problem of slit nozzles, which is the narrowing of the width of the liquid films due to surface tension. A still further object of the present invention is to provide a nozzle suited to use in this polymerization method.

SUMMARY OF THE INVENTION

The present inventors conducted extensive research, resulting in the discovery that the problems of prior arts could be solved by injecting the liquid films in such a manner that at least one of the first liquid and the second liquid expanded spatially; the present invention was devised on that basis.

That is, the present invention provides a method of polymerization in which a first liquid and a second liquid are mixed in a gas phase and polymerized in the form of droplets, characterized in that a polymerizable monomer and a polymerization initiator are contained in at least one of said first liquid and said second liquid, and in that at least one of said first liquid and said second liquid is injected as a spatially expanding liquid film.

In the polymerization method of the present invention, at least one of the first liquid and the second liquid is desirably injected with a velocity component coplanar with the injection surface. It is also possible to inject at least one of the first liquid and the second liquid as a spatially expanding liquid film, so that a cross section of the injected liquid film comprises a curved section, or is a hollow circle. The desirable case is that the cross sections of both of the first liquid and the second liquid injected are hollow circles. In this process, the first solution and the second solution are desirably injected so that the hollow circle of the first liquid is arranged inside of the hollow circle of the second liquid. Further, it is desirable to arrange the center of the hollow circle of the first liquid and that of the second liquid on a single axis. Still further, the injection pressure of the liquid is desirably adjusted so that at least one of the first liquid and the second liquid film flows along a tulip-shaped or onion-shaped path after the injection. Still further, the injection pressure of the first liquid and second liquid is desirably adjusted so that both the first liquid and the second liquid flow along a tulip-shaped path or onion-shaped path after being mixed. The polymerization initiator employed in the polymerization method of the present invention is a redox polymerization initiator comprising an oxidizing agent and a reducing agent. The polymerizable monomer, oxidizing agent, and reducing agent are each desirably incorporated into at least one of the first liquid and the second liquid.

Further, the present invention provides nozzles for the above-described polymerization method that consists of a first round outlet for injecting the first liquid and a second round outlet for injecting the second liquid, wherein: a first guide with round cross-section is connected to the first round outlet and the first liquid is provided from the first inlet so as that the first liquid forms a spiral flow along the inner wall of the first guide to the first round outlet; a second guide with round cross-section is connected to the second round outlet and the second liquid is provided from the second inlet so as that the second liquid forms a spiral flow along the inner wall of the second guide to the second round outlet; and the first round outlet, the second round outlet, the first guide, and the second guide are arranged coaxially.

Figure 1:
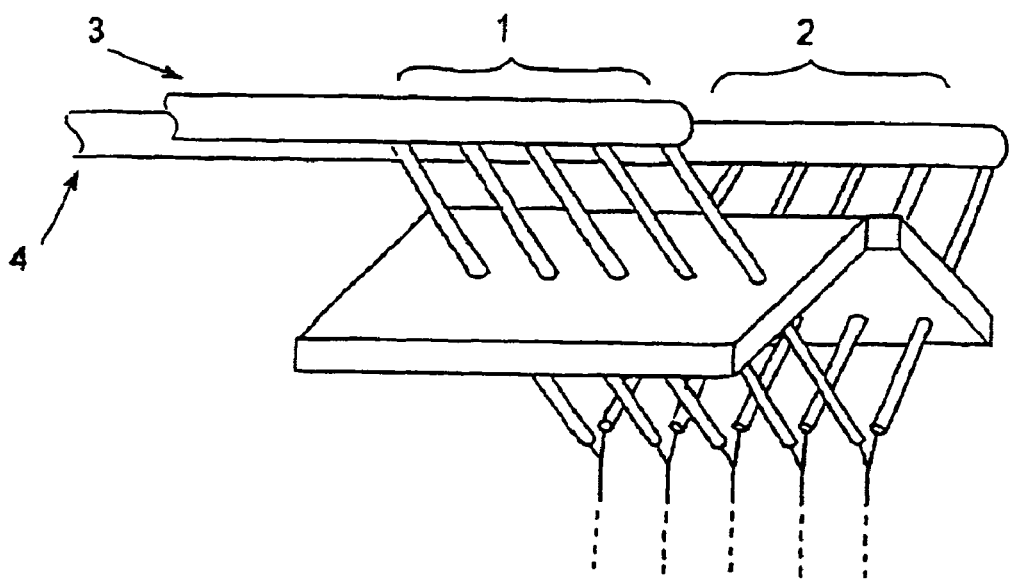
FIG. 1 is a drawing of an example of the opposed nozzles that are conventionally employed.
Figure 2:
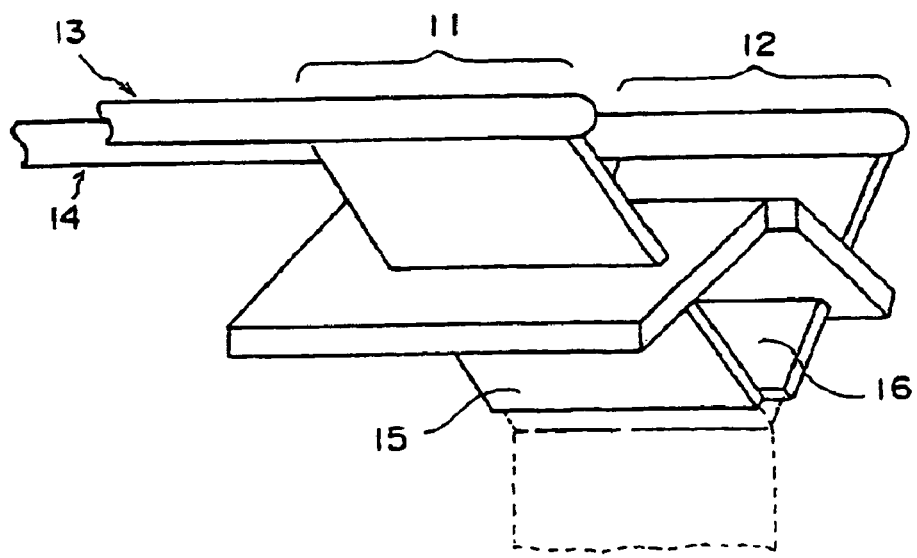
FIG. 2 is a drawing of an example of a slit nozzle that has been employed in prior art.

In the drawings, 1 and 11 are the nozzles for the first liquid, 2 and 12 are nozzles for the second liquid, 3 and 13 are the first liquid, 4 and 14 are the second liquid, 15 and 16 are slits, 21 is the first guide, 22 is the second guide, 23a and 23b are the inlet ports for the first liquid, 23c and 23d are the inlet ports for the second liquid, 24 is the first round outlet, 25 is the second round outlet, and 26 is an O-ring.

DETAILED DESCRIPTION OF THE INVENTION

The polymerization method of the present invention and nozzles employed in this polymerization method are described in detail as follows. In the present specification, the symbol "-" indicates that the preceding and succeeding numeric values are included in the stated range as minimum and maximum, respectively.

The polymerization method of the present invention is characterized in that, in mixing a first liquid and a second liquid in a gas phase and conducting droplet polymerization, at least one of the first liquid and the second liquid is injected in the form of a spatially expanding liquid film.

Here, the phrase "injected is the form of a spatially expanding liquid film" means that liquid is injected so that the liquid film expands out over an area wider than the area of the nozzle outlet through which the liquid is injected. In conventional droplet polymerization employing the above-described slit nozzles, the sectional area of the injected liquid film is same as that of the outlet immediately after the injection, but gradually the width is narrowing due to surface tension as the liquid flows away. In the present invention, to avoid narrowing of the liquid film due to surface tension, the liquid is injected through the nozzle outlet so that the liquid spatially expands.

Figure 3:
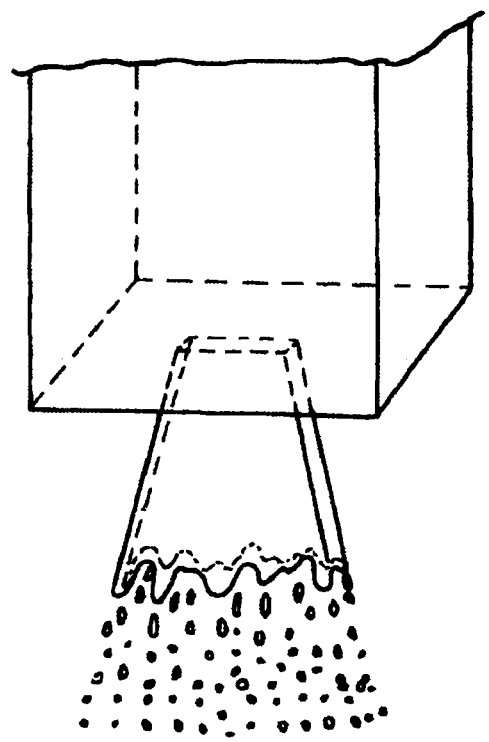
FIG. 3 is a drawing of an example of a mode of injecting liquid of the present invention.

Modes of which a liquid film is injected so as that it spatially expands are not specifically limited. For example, the liquid can be injected with a velocity component of the lengthwise direction of the slit, such as is shown in FIG. 3. If the liquid is injected with a velocity component in the same plane as the plane in which the liquid is injected (the plane containing the nozzle outlet, or parallel with the nozzle outlet) and expands, the method of the present invention can be easily practiced. The injection angle and injection speed can be suitably determined in these cases according to the impact position of the two liquids, the slit size, the permissible range of functions of the targeted water-absorbent polymer, and so on.

Figure 4:
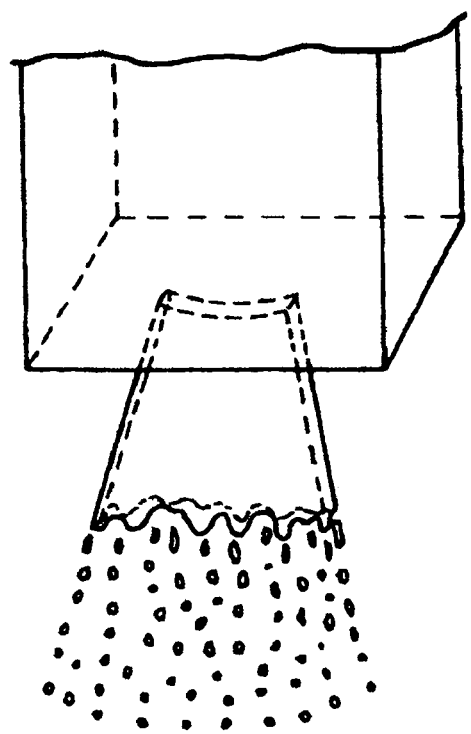
FIG. 4 is a drawing of an example of another mode of injecting liquid of the present invention.

The method of the present invention can be applied to the cases that the liquids are injected through other than slit nozzles. For example, the present invention can be applied to the cases of the nozzle which has an outlet with a curved section. Specific examples are semicircular, C-shaped, J-shaped, and U-shaped outlets. The radius of curvature of the curved section may be constant or variable, but constant curvatures are preferred in the present invention. For example, as shown in FIG. 4, if the radius of curvature of the outlet surface of the nozzle is constant, the liquid may be injected with a velocity component of the radial outside of the curve.

Figure 5:
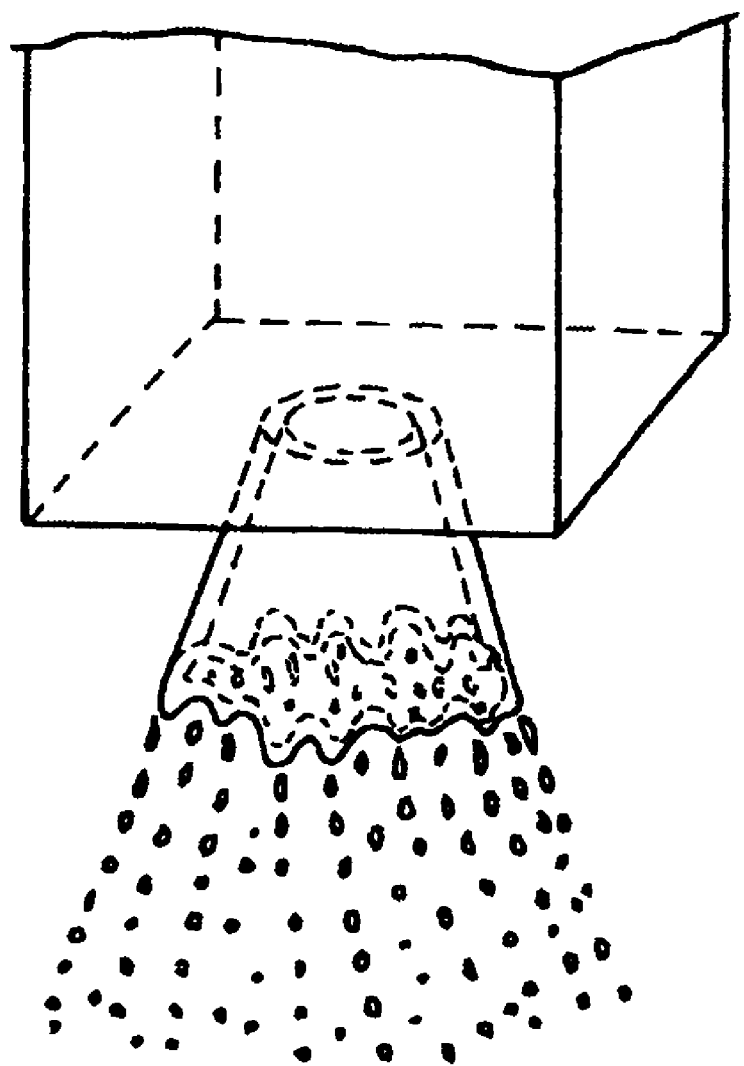
FIG. 5 is a drawing of an example of yet another mode of injecting liquid of the present invention.

The method of the present invention is best applied when the liquid is injected in a hollow circle shape from an outlet of the nozzle. In such cases, it is sufficient to make the curvature of the hollow circle constant. Some variation in curvature may be allowed to the extent that the effect of the present invention is effective. A polygonal structure that is essentially close to round is acceptable. A complete circle having a constant curvature is preferred. In the case that the cross section of the injected liquid film is a hollow circle, the liquid does not partially incline to one side because the injection is uniform. Specifically, as in the example shown in FIG. 5, the liquid can be injected with a velocity component of the radial outside of the hollow circle. It also can be injected with a velocity component in a direction tangential to the circle. Still further, it can be injected with a velocity component suitably combining a radial velocity component and a tangential velocity component as coplanar or parallel with the injection surface.

Figure 6:
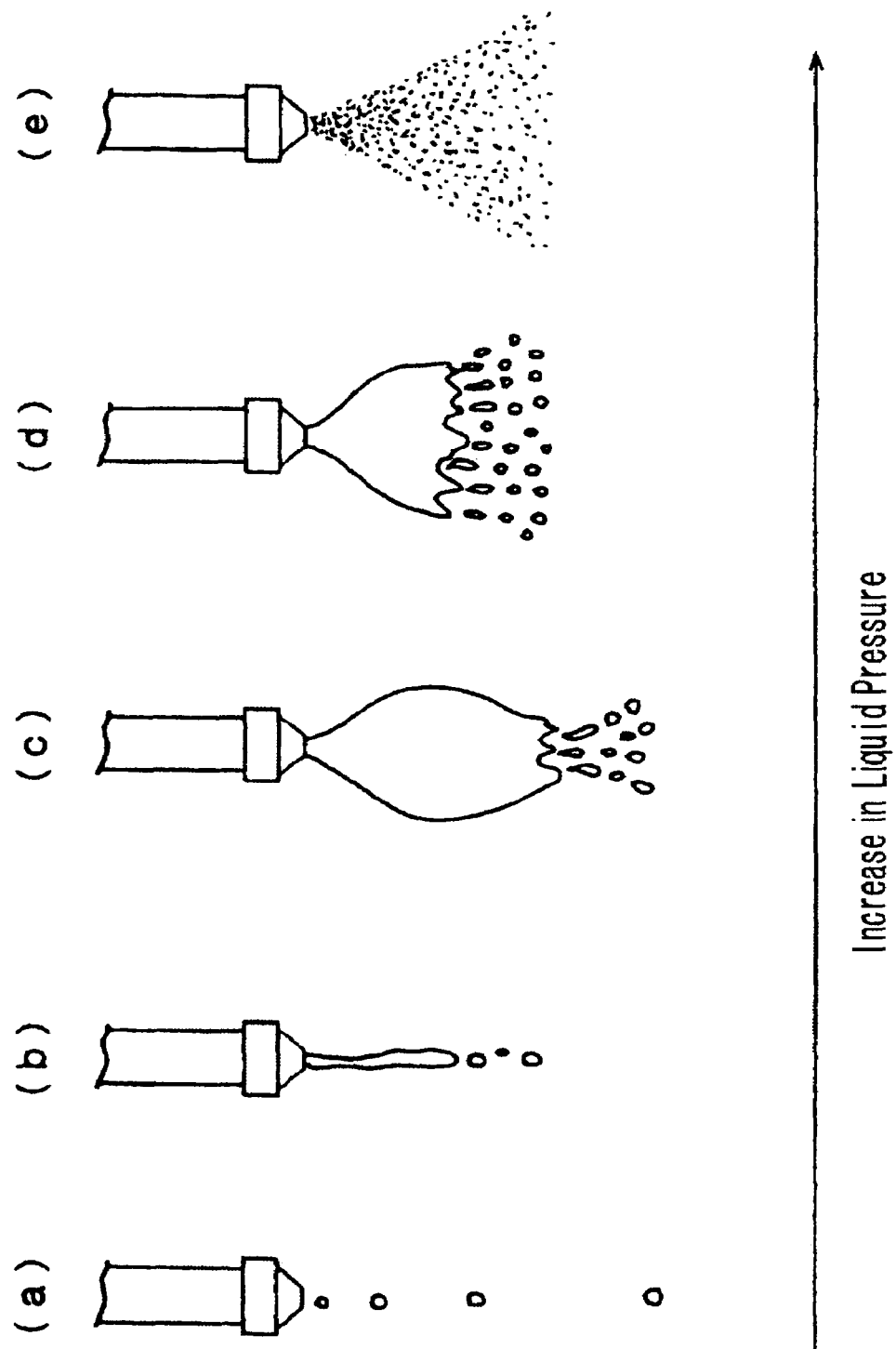
FIG. 6 consists of drawings showing how liquid is injected from a completely round outlet at varying speeds.

The shape of the path followed by the falling liquid is not specifically limited. However, the liquid preferably flows along a tulip-shaped or onion-shaped path as it falls. FIG. 6 shows the injection of liquids from completely round outlets of a nozzle. The higher the injection pressure is, the greater the tangential velocity component generates. In FIG. 6, the injection pressure increases from left to right. When the injection pressure is low, the liquid forms large droplets at the outset and falls (FIG. 6(a)). When the injection pressure increases somewhat, the injection starts out as a liquid column, eventually breaks up into droplets and falls (FIG. 6(b)). When the injection pressure increases still further, a hollow liquid film is formed and falls. In the state shown in FIG. 6(c), the sectional diameter of the hollow liquid film reaches a maximum along the way, and then gradually contracts due to the effect of surface tension, finally breaks up into droplets and falls. This state is called an "onion" shape. When the injection pressure increases even further, the hollow liquid film breaks up before contracting, and falls as droplets (FIG. 6(d)). This state is referred to as a "tulip" shape. When the injection pressure increases beyond this, fine droplets (mists) form immediately after injection, falls expanding (FIG. 6(e)). These falling behaviors after injection are described in detail by A. H. Lefebvere in "Atomization and Sprays", Taylor & Francis.

Such liquid paths can be controlled by adjusting the velocity component coplanar with the injection surface. When the velocity component coplanar with the injection surface is increased, for example, an onion-shaped path can be changed to a tulip-shaped path. It is even possible to combine the above-described radial velocity component and tangential velocity component.

In the polymerization method of the present invention, injection is conducted so that at least one of the first liquid and the second liquid expands spatially. Accordingly, so long as either one of the two expands, the injecting method of the other liquid is not specifically limited. It is also possible to conduct injection so that both the first and second liquids expand spatially.

In preferred modes of implementing the present invention, injection is desirably conducted so that the cross sections of both the first and second liquid films are hollow circles. In that case, injection is desirably conducted so that the liquid film circle of the first liquid is arranged inside of the hollow circle of the second liquid. At that time, the first liquid is desirably injected so that the diameter of the hollow circle expands in accordance with the present invention. By contrast, it is sufficient to make the second liquid flow together with the first liquid. Accordingly, the second liquid may be injected so that the radius of the hollow circle expands, narrows, or remains constant. It may also be injected in mist form.

Further, it is desirable to suitably select a combination of injection speed (injection pressure) and injection direction of the first and second liquids so that the first and second liquids flow along a tulip-shaped or onion-shaped path after mixing. For example, the first liquid alone may be injected so that it flows along a tulip-shaped or onion-shaped path, and the second liquid may be injected to collide with the first liquid. Further, air pressure may be applied from inside to make the first and second liquids collide and make mixed liquid flow along a tulip-shaped or onion-shaped path.

The size of the droplets after mixing of the first and second liquids is preferably from 5 to 3,000 micrometers, more preferably from 50 to 1,000 micrometers. Polymerization is initiated immediately upon mixing of the two liquids, with the mixture dropping within the polymerization chamber even as polymerization occurs in the droplets. The atmosphere in the polymerization chamber may be set arbitrarily so long as the polymerization reaction is not impeded. Usually, nitrogen, helium, or carbon dioxide is employed as the ambient gas, but air or water vapor may also be employed. When introducing water vapor into the atmosphere, it suffices to make the settings from the perspective of how much moisture evaporates from the polymerizable monomer-containing liquid based on the concentration of the polymerizable monomer-containing liquid employed in the reaction and the water content desired per polymer particle produced. The ambient temperature is usually set from room temperature to 150° C., preferably from room temperature to 100° C.

The nozzle used to practice the polymerization method of the present invention is described below. Here, so long as the nozzle permits the practice of the polymerization method of the present invention, it is possible to suitably select and combine nozzle structures known in prior art.

For example, injection can be conducted with a nozzle which has a characteristic injection guide to flow the liquid to the outlet of the nozzle so that the liquid can expand spatially from the outlet of the nozzle by applying pressure to the nozzle. Specifically, a nozzle can be employed in which the injection guide is formed as a slit, with the width of the slit getting thinner from the inlet to the outlet of the nozzle), and the length of the slit increasing. Applying this same principle, if the cross section of the injected liquid film is a curve or a hollow circle, a nozzle with which the liquid film expands spatially can be designed.

Further, a nozzle with a characteristic part to change the flow path in or in front of the outlet may also be employed. For example, a nozzle may be employed with which the liquid flows through a cylindrical path to a position just above the nozzle outlet, collide to a cone deflector to change the flow path, and the liquid injected from a round outlet so that it expands radially to the outside. By suitably designing the shape of the deflector, it is possible to adjust the injection speed and direction from the outlet as desired. Further, the thickness of the liquid film may be controlled by varying the size and shape of the nozzle and adjusting the flow rate.

A nozzle controlling the injection direction and speed of the liquid using air pressure may also be employed in the present invention. For example, air pressure may be applied to the outlet in a desired direction so that the liquid can be injected in that direction. Further, the air pressure may be applied on the liquid inside of the nozzle or used to change the flow path after collision of the first and second liquids.

In the case of the cross section of the injected liquid film comprises a curve or is a hollow circle, a nozzle to inject the liquid after swirling it inside is preferred in order to inject the liquid with a velocity component in a curved direction or a direction tangential to the circle. For example, a tangential velocity component can be given at the outlet by applying pressure to an injection guide having a spiral groove. Alternately, the spiral groove can be omitted and centrifugal force exploited to cause the liquid to drop linearly while rotating along a cylindrical inner wall.

A nozzle most preferred for the present invention has a combination of such a guide and a round outlet to generate a rotation in double concentric swirl nozzles arranged coaxially. In the present Specification, the term "double concentric swirl nozzle" means a nozzle for use in the above-described polymerization method that consists of a first round outlet for injecting the first liquid and a second round outlet for injecting the second liquid, characterized in that: a first guide (swirl chamber) with round cross-section is connected to the first round outlet and the first liquid is provided from the first inlet so as that the first liquid forms a spiral flow on the inner wall of the first guide (swirl chamber) to the first round outlet; the second liquid is provided from the second inlet so as that the second liquid forms another spiral flow on the inner wall of the second guide (swirl chamber) to the second round outlet; and the first round outlet, the second round outlet, the first guide (swirl chamber), and the second guide (swirl chamber) all are arranged coaxially.

With a double concentric swirl nozzle, it is possible to inject the first liquid from the inner first outlet in a conical shape and inject the second liquid from the outer second outlet also in a conical shape. The injection angles and injection speeds of the first and second liquids should be adjusted so that the liquids collide upon injection. For example, the injection angle of the first liquid can be adjusted larger than that of the second liquid so that both liquids collide with each other. Air pressure can be applied to either the first liquid or second liquid to adjust the injection path and make efficient collision with the second liquid. The injection speed and flow rate of the first and second liquids in the present invention may be same or different.

Figure 7:
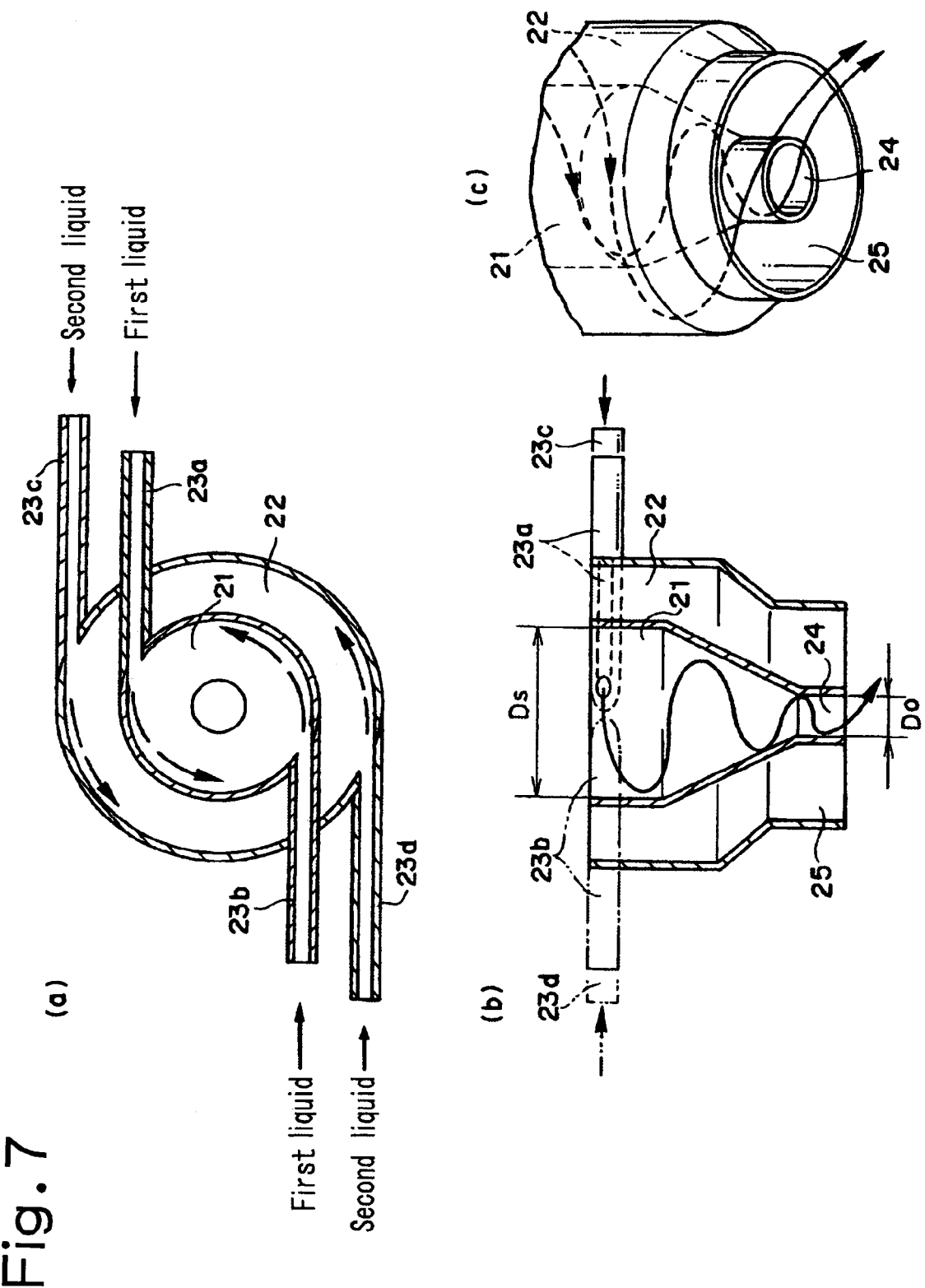
FIG. 7 consists of a perspective view and cross-sectional views of an example of a double concentric swirl nozzle.

FIG. 7 shows a specific example of a double concentric swirl nozzle. FIG. 7(a) is a horizontal cross-sectional view of the upper part of the guide of the double concentric swirl nozzle. The guide part of a swirl nozzle is generally called a swirl chamber. FIG. 7(b) is a vertical cross-sectional view of the double concentric swirl nozzle. As indicated in FIG. 7(a), two inlet ports (23a, 23b) are provided in the first guide (21) to supply the first liquid. The first liquid passes through inlet ports (23a, 23b) in the direction indicated by the arrows forcefully into the first guide (21). The first liquid reaches the first round outlet (24) in a spiral flow along the inner wall of the first guide (21) due to centrifugal force and gravity (FIG. 7(b)). Similarly, two inlet ports (23c, 23d) are also provided in the second guide (22). The second liquid passes through these inlet ports (23c, 23d) forcefully into the second guide (22) and reaches the second round outlet (25) in another spiral flow. As shown in FIG. 7(c), the first and second liquids have velocity components in a tangential direction at the outlets and injected out, flowing together in the gas phase. The design of the double concentric swirl nozzle of FIG. 7 can be suitably changed based on the type of first and second liquids employed, the objective of polymerization, and so on. For example, the number of inlet ports can be changed, and the diameter, height of angle of the swirl chambers can be changed.

Figure 8:
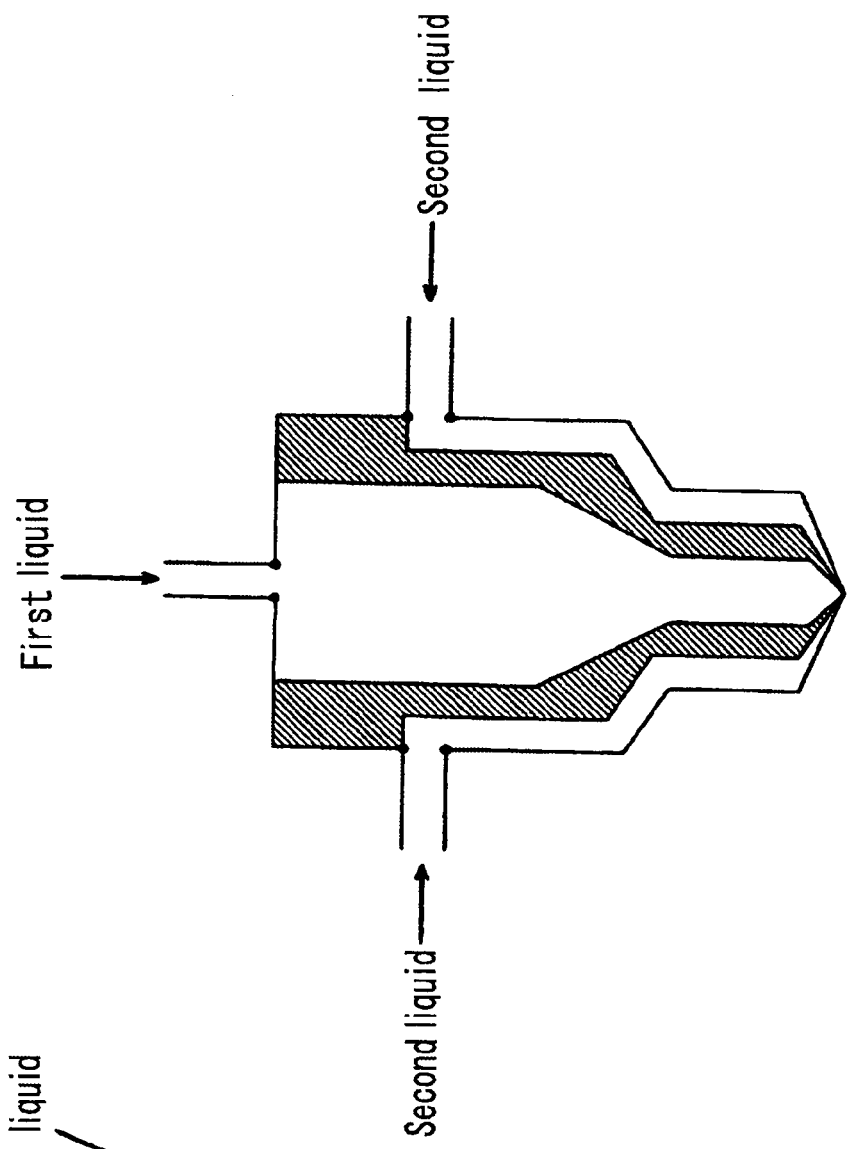
FIG. 8 consists of cross-sectional views of examples of double concentric swirl nozzles.

The first and second liquids that are injected from the outlets must meet and be mixed in the gas phase. Accordingly, it is desirable to prevent the two liquids from "a shortcut" and mixing inside the nozzle or at nozzle inlet. For example, as shown in FIG. 8(a), sealing devices such as O-rings (26) can be employed in the nozzle assembly to prevent the first and second liquids from mixing. However, since the first and second liquids are introduced into the nozzle at high pressure, it is necessary to ensure that, the O-ring seal prevents a shortcut allowing the liquids to mix during long-term use.

To reliably prevent such shortcuts, it is particularly desirable to employ a structure in which the first liquid path and the second liquid path are separated and a shortcut due to liquid leaks is precluded. For example, as shown in FIG. 8(b), a shortcut can be reliably prevented by completely separating two flow paths. The use of such a structure permits the omission of the relatively difficult assembly operation of sealing by precisely inserting O-rings such as that shown in FIG. 8(a) at appropriate positions. Since the two nozzles can then be assembled by securing them in steps, the structure shown in FIG. 8(b) is practically more advantageous.

When employing a double concentric swirl nozzle, the Weber number (We1) at the first outlet and the Reynolds number (Re1) at the first guide desirably satisfy the following conditions:

$$10{,}000 \leq (We1) \times (Re1)^{0.5}$$

$$(We1)^{1.17} \times (Re1)^{0.33} \leq 100{,}000.$$

When employing a double concentric swirl nozzle, the Weber number (We2) at the second outlet and the Reynolds number (Re2) at the second guide desirably satisfy the following condition:

$$(We2) \times (Re2)^{0.5} \leq 40{,}000.$$

In the present invention, it is particularly desirable for these three relations to be satisfied.

The Reynolds number (Re) can be obtained from the viscosity $\mu$ and density $\rho$ of the liquid, the diameter Ds of the swirl chamber, and the inlet flow speed Vi of the liquid into the swirl chamber using the following equation:

$$Re = \mu \times (Ds/2) \times Vi/\rho.$$

Further, The Weber number (We) can be obtained from the surface tension $\sigma$ and density $\rho$ of the liquid, thickness of the liquid film at the outlet (thickness in a direction perpendicular to the nozzle axis) t, and liquid velocity Vo at the injection outlet from the following equation:

$$We = \sigma \times t \times Vo^2/\rho.$$

The preferred ranges of Re1, We1, Re2, and We2 are given as follows.

$$1{,}000 < Re1 < 5{,}000$$

$$200 < We1 < 2{,}000$$

$$Re2 < 2{,}000$$

$$We2 < 300$$

In the present invention, the parameters which make up the computational equations of the Reynolds number (Re) and Weber number (We) can be suitably adjusted to satisfy these three relations. Specifically, swirl chambers of double concentric injection nozzles satisfying the above-stated relations can be designed based on the first and second liquids employed, the flow rate conditions of first and second fluids satisfying the above-stated relations can be adjusted based on the double concentric swirl nozzle employed, and further thickeners and/or surfactants can be added to the first and second liquids to control the physical properties thereof. This design of the nozzle dimension and adjustment of liquid propertied can also be employed together.

The viscosity (μ) of first and second liquids suited to the polymerization method of the present invention is normally from 0.3 to 20 mPa·s, preferably from 0.5 to 10 mPa·s. The surface tension (σ) is normally from 10 to 100 mN/m (dyn/cm), preferably from 20 to 50 mN/m (dyn/cm). The density (ρ) is normally from 500 to 2,000 kg/m$^3$ (from 0.5 to 2 g/cm$^3$), preferably from 700 to 1,500 kg/m$^3$ (from 0.7 to 1.5 g/cm$^3$).

Polymerization can be conducted with quite good efficiency by designing and making adjustments to satisfy the above-stated relations. That is, the first and second liquids can be mixed and reacted with good efficiency and polymer with good properties can be smoothly produced.

In the polymerization method of the present invention, the polymerizable monomer and polymerization initiator are contained in at least one of the first and second liquids. The liquid containing the polymerizable monomer must not undergo polymerization prior to mixing with the second liquid.

For example, when employing a redox polymerization initiator comprising an oxidizing agent and a reducing agent as the polymerization initiator, the oxidizing agent can be incorporated in advance into the first liquid and the reducing agent into the second liquid. In that case, the polymerizable monomer may be incorporated into either the first or second liquid, or both liquids. Further, the polymerizable monomer may be incorporated into the first liquid, and the second solution may be prepared by mixing in the oxidizing agent and reducing agent immediately prior to use.

The type of polymerizable monomer employed in the polymerization method of the present invention is not specifically limited. Examples that can be suitably selected for use based on the application are vinyl compounds, vinylidene compounds, vinylene compounds, and cyclic olefin compounds. These polymerizing monomers may be broadly divided into water-soluble polymerizing monomers and oil-soluble polymerizing monomers based on the type of substituents they comprise. Examples of water-soluble polymerizing monomers are olefin unsaturated carboxylic acids and salts thereof, olefin unsaturated sulfonic acids and salts thereof, olefin unsaturated amines, and olefin unsaturated amides. Examples of oil-soluble polymerizing monomers are styrene, isobutene, vinyl chloride, vinyl acetate, acrylic acid esters, and methacrylic acid esters. Otsu Takayuki, "The Chemistry of Polymer Synthesis" (Kagaku Dōjin) pp. 34-43 and the like may be consulted for reaction examples and specific examples of polymerizable monomers suitable for use in the present invention. These monomers may be employed singly or in combinations of two or more.

The application of the polymerization method of the present invention to various monomers permits the efficient production of various polymers conventionally obtained by solution polymerization, emulsion polymerization, and suspension polymerization methods. Further, the introduction of polymerizable monomers conventionally employed in emulsion polymerization and suspension polymerization into the polymerization method of the present invention permits soap-free polymerization. Thus, adhesives, glues, paints, inks, and the like may be provided.

Further, in the polymerization method of the present invention, the type of monomer may be selected and the admixture of the second liquid may be controlled to control the structure of the polymer (for example, to build core-shell structures, produce microcapsules, and produce block polymers). Thus, for example, pressure-sensitive adhesives, pressure-sensitive glues, sealants, coloring matter, pigments, pharmaceuticals, hard coats, and mold releasing agents may be provided.

Methods of producing water-absorbent polymers conventionally obtained by suspension polymerization or solution polymerization are specifically described below.

When producing a water-absorbent polymer, an aliphatic unsaturated carboxylic acid or salt thereof is desirably selected as the polymerizable monomer. Specific examples are vinyl compounds such as acrylic acids and salts thereof, vinylidene compounds such as methacrylic acid or salts thereof, other unsaturated monocarboxylic acids and salts thereof, as well as maleic acid and salts thereof, fumaric acid and salts thereof, itaconic acid and salts thereof, and other unsaturated dicarboxylic acids and salts thereof. These may be employed singly or in combinations of two or more. Of these, the preferred compounds are acrylic acid and salts thereof and methacrylic acid and salts thereof, with acrylic acid and salts thereof being particularly preferred. In the production of water-soluble or water-absorbent polymers, these aliphatic unsaturated carboxylic acids or salts thereof are desirably employed in a proportion of greater than or equal to 50 mole percent, preferably greater than or equal to 80 mole percent, relative to the total quantity of polymerizable monomer.

Examples of commonly employed salts of aliphatic unsaturated carboxylic acids are water-soluble salts such as alkali metal salts, alkaline earth metal salts, and ammonium salts. The degree of neutralization thereof is suitably established based on the objective. For acrylic acid, an acrylic acid in which from 20 to 90 mole percent of the carboxyl groups have been neutralized by an alkali metal salt or ammonium salt is preferred. When the partial degree of neutralization of acrylic acid monomer is less than 20 mole percent, the water-absorbent capacity of the water-absorbent polymer produced tends to drop sharply.

Hydroxides of alkali metals, sodium bicarbonate, ammonium hydroxide, and the like may be employed to neutralize acrylic acid monomers, with alkali metal hydroxides being preferred. Specific examples are sodium hydroxide and potassium hydroxide.

When producing a water-absorbent polymer by the polymerization method of the present invention, polymerizable monomers capable of copolymerizing with aliphatic unsaturated carboxylic acids may be copolymerized therewith; examples are: (meth)acrylamide, (poly)ethyleneglycol (meth)acrylate, and 2-hydroxyethyl (meth)acrylate. Further, monomers of little solubility in water such as methyl acrylate, ethyl acrylate, and other acrylic acid alkyl esters may also be copolymerized in quantities of a degree that does not compromise the properties of the water-soluble polymer produced. In the present Specification, the term "(meth) acrylic" refers to both "acrylic" and "methacrylic".

The concentration of the polymerizable monomer contained in the polymerizable monomer-containing liquid employed in the present invention is suitable determined based on the objective. For example, in the case of a polymerizable monomer-containing liquid comprising an aliphatic unsaturated carboxylic acid or salt thereof as a main component, the concentration of the polymerizable monomer is desirably set to greater than or equal to 20 weight percent, preferably greater than or equal to 25 weight percent. The polymerization rate is excessively low when the concentration is less than 20 weight percent, with the water-absorbent capacity of the water-absorbent monomer tending to be inadequate following polymerization. The upper limit is set to about 80 weight percent to facilitate handling of the polymerization reaction solution.

A crosslinking agent may be incorporated into the polymerizable monomer-containing liquid employed in the present invention. For example, aliphatic unsaturated carboxylic acids and salts thereof, particularly acrylic acid and its salts, sometimes form self-crosslinking polymers themselves, but a crosslinked structure is actively formed by adding a crosslinking agent. Further, when a crosslinking agent is added, the water-absorbent capacity of the water-absorbent polymer produced generally increases. Examples of crosslinking agents employed with preference are: divinyl compounds capable of copolymerizing with the above-described polymerizable monomers, such as N,N'-methylenebis(meth)acrylamide and (poly)ethyleneglycol (meth) acrylate; water-soluble compounds having two or more functional groups obtained by reaction with carboxylic acid, such as ethylene glycol diglycidyl ether, polethylene glycol diglycidyl ether, and other polyglycidyl ethers. Of these, N,N'-methylenebis(meth)acrylamide is particularly preferred. The quantity of crosslinking agent employed is from 0.001 to 1 weight percent, preferably from 0.01 to 0.5 weight percent, of the quantity of monomer employed. These crosslinking agents may also be incorporated into the liquid into which the initiator is mixed.

The materials described in paragraphs [0012] through [0015] of Japanese Unexamined Patent Publication (KOKAI) Heisei No. 9-255704 may also be employed in the polymerization method of the present invention.

The type of polymerization initiators employed in the polymerization method of the present invention is not limited other than that the polymerization initiator be capable of initiating the polymerization of a polymerizable monomer.

Examples suitable for use are thermodecomposition polymerization initiators such as benzoyl peroxide, acetyl peroxide, lauroyl peroxide, other peroxides, azobisisobutyronitrile and other azo compounds. Redox polymerization initiators such as those set forth above are employed with preference. Redox polymerization initiators that comprise a combination of a radical producing agent exhibiting acidity and a reducing agent are generally employed with preference.

Examples of the oxidizing agents of aqueous redox polymerization initiators are persulfates and hydrogen peroxide. Further, examples of the reducing agents of the aqueous redox polymerization agent are inorganic reducing agents such as ferrous salt, and sodium sulfite, and organic reducing agents such as alcohols, amines, and ascorbic acid.

Examples of the oxidizing agent in nonaqueous redox polymerization initiators are: t-butylhydroperoxide, cumenehydroperoxide, other hydroperoxides, dialkyl peroxides, and diacyl peroxides. Examples of reducing agents in nonaqueous redox polymerization initiators are tertiary amines, napthenic acid salts, and mercaptans.

The oxidizing agent in the redox polymerization initiator is desirably employed in a proportion of from 0.01 to 10 weight percent, preferably 0.1 to 2 weight percent, of the polymerizable monomer. Further, the reducing agent of the redox polymerization initiator is desirably employed in a proportion of from 0.01 to 10 weight percent, preferably from 0.1 to 2 weight percent, of the polymerizable monomer.

The materials and techniques described by Otsu Takayuki in "The Chemistry of Polymer Synthesis, Revised" (Kagaku Dōjin), pp. 59-69, may be employed for the polymerization initiator.

When producing water-absorbent composites by the polymerization method of the present invention to immobilize a water-absorbent polymer on a fibrous substrate, fibrous substrate sheets are inserted into a polymerization chamber, and while transferring the sheets across the surface of the polymerization chamber floor in parallel, polymer particles in the process of polymerizing that fall thereon are desirably caused to adhere. Any fibrous substrate that has been formed into a fixed shape and facilitates the adhesion of polymer particles undergoing polymerization will do; these include cloth, paper, pulp, and nonwoven fabric. Of these, fluff pulp and nonwoven fabric in which a fibrous substrate is coarsely accumulated, into which polymer particles readily penetrate, and to which polymer particles strongly adhere, are preferred. Particularly preferred are nonwoven fabrics of high strength even when wet, such as polyester, polyolefin, polyamide, acetate, and other (semi)synthetic fibers. The thickness of the fiber of the fibrous substrate constituting the nonwoven fabric is desirably from 10 to 50 micrometers, and the density of the nonwoven fabric is from 10 to 100 $g/m^2$, preferably from 20 to 50 $g/m^2$.

The various conditions are set so that the rate of polymerization at the point where a granular aggregate is formed by the droplets undergoing polymerization in a gas phase or on a fibrous substrate is from 3 to 97 percent, preferably from 20 to 97 percent, and more preferably from 50 to 95 percent. When the polymerization rate is excessively low, the droplets do not form a granular aggregate even when they collide together, but mass into large particles, or when the droplets fall onto the fibrous substrate, the liquid spreads across the fibrous material, is absorbed, or penetrates, tending not to adhere to the granular material consisting of fibrous substrates. Further, if the polymerization rate is excessively high, the water-absorbent polymer will not adhere to and will not be immobilized well on the fibrous substrate.

The polymer particles desirably adhere to the fibrous substrate in a content in the water-absorbent composite finally obtained of from 50 to 400 $g/m^2$. Although depending on the application, adhesion of from 80 to 300 $g/m^2$ is even more preferred. When the content of polymer particles in the water-absorbent composite is low, the water-absorbent capacity is low. An excessively high content thereof is uneconomical, the ratio of the portion bonding to the fibrous substrate decreases, and bonding to the fibrous substrate becomes weak.

At least some of the polymer particles constituting the water-absorbent composite produced by the method of production of the present invention bond to the polymer particles undergoing polymerization (primary particles), constituting granular aggregate. A portion of the polymer particles (primary particles) constituting this granular aggregate desirably does not directly bond to the fibrous substrate. Since the specific surface area of such a granular aggregate is high, the water-absorption speed is high. Further, since only some of the primary particles constituting the granular aggregate are bonded to the fibrous substrate, the constraint undergone by the fibrous substrate during water absorption and swelling is low and the water absorbing capacity is high. Since the junction surfaces of the primary grains constituting the granular aggregate are combined, both before and after water absorption, the granular aggregate seldom breaks down into primary particles and drops off the fibrous substrate. Desirably 30 weight percent or more, preferably 50 weight percent or more, and more preferably, 80 weight percent or more of the polymer particles are granular aggregate. Generally, the higher the proportion of granular aggregate, the better the performance as a water-absorbent material. The particle size of the granular aggregate desirably falls within a range of from 100 to 3,000 micrometers. When the particle size is less than 100 micrometers, water-absorbent performance tends to be insufficient. When the particle size is greater than 3,000 micrometers, adhesion to sheets of fibrous substrate tends to be poor. The proportion and particle size of the granular aggregate can be controlled chiefly by suitably adjusting the particle density and distribution state of particles undergoing polymerization in the gas phase, and the fluidity state. For example, to increase the ratio of granular aggregate, the quantity of polymer falling per unit of cross-sectional area in the polymerization chamber can be increased or an upward flow can be generated in the polymerization chamber to slow the dropping speed of the polymer particles, thereby increasing the chances that grains that are undergoing polymerization will contact each other while dropping. A further method is to generate a deflection flow in the polymerization chamber to distort the distribution of falling polymer grains.

Once the water-absorbent polymer has been applied to the fibrous substrate, steps such as a moisture content adjusting step, surface crosslinking step, and residual monomer processing step may be suitably conducted to obtain a water-absorbent composite. The water-absorbent composite thus produced may be employed in the various applications in which water-absorbent polymers have been employed thus far. Various applications of water-absorbent polymers are introduced in "Water-absorbent polymers", pp. 81-111 (Fusayoshi Masuda, Kyōritsu Publishing, 1987); "Development Trends in Highly Water-Absorbent Resins and their Applications" (Eizō Ōmori, Technoforum, 1987); Kenji Tanaka, "Industrial Materials", Vol. 42, No. 4, pp. 18-25, 1994; and Nobuyuki Harada and Tadao Shinomura, Ibid., pp. 26-30. Examples are paper diapers, hygienic products, freshness-preserving products, moisturizers, cold insulators, antifogging agents, and soil-enhancing agents.

Use in the applications of the sheet water-absorbent composites proposed in Japanese Unexamined Patent Publication Showa No. 63-267370, Showa No. 63-10667, Showa No. 63-295251, Showa No. 270801, Showa No. 63-294716, Showa No. 64-64602, Heisei No. 1-231940, Heisei No. 1-243927, Heisei No. 2-30522, Heisei No. 2-153731, Heisei No. 3-21385, Heisei No. 4-133728, and Heisei No. 11-156118 is also possible.

The characteristics of the present invention are specifically described below through examples and comparative examples. The materials, use amounts, proportions, processing contents, treatment methods and the like that are set forth below may be suitably modified within the scope and spirit of the present invention. Accordingly, the scope of the present invention is not to be interpreted as being limited to the specific examples given below.

(Preparation of Starting Materials)

To 125 weight parts of 80 weight percent acrylic acid aqueous solution were added 57.3 weight parts of a 48.5 weight percent of sodium hydroxide aqueous solution, 6.4 weight parts of water, 0.15 weight part of N,N-methylenebisacrylamide as a crosslinking agent, and 5.0 weight parts of a 30 weight percent hydrogen peroxide aqueous solution as an oxidizing agent to prepare solution A. The monomer concentration in solution A was 60 weight percent, the degree of neutralization was 50 mole percent, the viscosity was 7 mPa·s, the density was 1,200 kg/m$^3$ (1.2 g/cm$^2$), and the surface tension was 40 mN/m (dyn/cm).

Separately, to 125 weight parts of an 80 weight percent acrylic acid aqueous solution were added 57.3 weight parts of a 48.5 weight percent sodium hydroxide aqueous solution, 9.9 weight parts of water, 0.15 weight part of N,N-methylenebisacrylamide as a crosslinking agent, and 1.5 weight parts of L-ascorbic acid as a reducing agent to prepare solution B. The monomer concentration and degree of neutralization of solution B were same as those of solution A. The viscosity of solution B was 7 mPa·s, the density was 1,200 kg/m$^3$ (1.2 g/cm$^2$), and the surface tension was 40 mN/m (dyn/cm).

EXAMPLES 1-4

Using the double concentric swirl nozzle (FIG. 7) which has two orifices of the diameter shown in Table 1, the solutions shown in Table 1 were fed to inner and outer nozzles. The temperature of the solutions was 40° C., and the solutions were injected at the flow rates and pressures indicated in Table 1.

Solutions A and B collided outside near the nozzle exits, disintegrated to form droplets, and fell through a gas phase (air, temperature 50° C.) while allowing the polymerization to proceed therein. Some droplets collided in the gas phase forming granular aggregates and fell onto a polyester nonwoven fabric substrate (density: 30 g/m$^2$) arranged 3 meters under the nozzle, and polymerization completed on the substrate. Other droplets fell directly onto the substrate, formed granular aggregates on the substrate, and completed polymerization on the substrate. The water-absorbent polymer was immobilized on the substrate through such complexation processes. The water content of the water-absorbent polymer immobilized on the substrate was from 20 to 30 weight percent. A 0.5 weight percent ethanol solution of ethylene glycol diglycidyl ether (EGDGE) was sprayed onto the composite to obtain 3,000 weight ppm of EGDGE relative to the polymer (dry polymer base). The composite on which the EGDGE ethanol solution had been applied was dried at 110° C. in a hot air dryer to reduce the water content of the polymer to 5 percent, yielding a water-absorbent composite. The amount of polymer immobilized was 200 g/m$^2$.

COMPARATIVE EXAMPLE 1

The opposed nozzles shown in FIG. 1 were employed in place of the double concentric swirl nozzles of Examples 1-4. Five nozzles for injecting solution A were arranged at intervals of 1 cm and five nozzles for injecting solution B were arranged at intervals of 1 cm. The nozzles for solution A and the nozzles for solution B were arranged opposite in pairs, comprising a total of five pairs of opposed nozzles. The inner diameter of each nozzle was 0.13 mm and the intersection angle of liquid A and liquid B flowing out of the opposed nozzles was 30 degrees. The distance from the tip of the opposed nozzles was adjusted to 4 mm. Using these opposed nozzles, 40° C. solution A and solution B were fed at a flow rate of 20 cm$^3$/min.

Solutions A and B flowed together in the form of liquid columns after issuing from the respective nozzles. After forming a liquid column of about 10 mm, liquid stream disintegrated into droplets. These droplets then fell through a gas phase (air, temperature 50° C.) while allowing the polymerization to proceed therein. Some droplets collided in the gas phase forming granular aggregates, which then fell onto a polyester nonwoven fabric substrate (density: 30 g/m$^2$) arranged 3 meters under the nozzles, and polymerization completed on the substrate. Other droplets fell onto the substrate, formed granular aggregates on the substrate, and completed polymerization. The water-absorbent polymer was immobilized on the substrate through such complexation processes. The water content of the water-absorbent polymer on the substrate was 20 weight percent. Subsequently, after conducting the same processes as in Examples 1-4, a water-absorbent composite was yielded. The water content of the polymer was 5 percent and the amount of polymer immobilized was 200 g/m².

COMPARATIVE EXAMPLE 2

The slit nozzle of Unexamined Japanese Patent Publication (KOKAI) Heisei No. 11-49805 shown in FIG. 1 was employed in place of the double concentric swirl nozzle of Examples 1-4. Each of the slits through which injected solutions A and B had a width of 0.05 mm and a length of 10 mm. The angle of intersection of liquids A and B flowing out of the opposed slits was adjusted to 30 degrees and the distance from the slits was adjusted to 10 mm. Solution A and solution B at the temperatures of 40° C. were fed at the flow rates of 150 cm³/min from each of the slits.

Although solution A and solution B were injected out of each of the slits as liquid films, the liquid film width decreased as the solutions flowed away from the outlets. At 2 cm from the outlet, the two liquid films collided, disintegrated to form droplets, and fell through the gas phase (air, temperature 50° C.) while allowing the polymerization to proceed therein. Some of the droplets collided in the gas phase, forming granular aggregates, fell onto a polyester nonwoven fabric substrate (density: 30 g/m²) arranged 3 m under the nozzle outlets and completed polymerization on the substrate. Other droplets fell onto the substrate, formed granular aggregate on the substrate and completed polymerization on the substrate. The water-absorbent polymer was immobilized on the substrate through such complexation processes. The water content of the water-absorbent polymer immobilized on the substrate was 30 weight percent. After conducting the same processes as in Examples 1-4, a water-absorbent composite was yielded. The water content of the polymer was percent and the amount of polymer immobilized was 200 g/m².

COMPARATIVE EXAMPLE 3

Using a double concentric swirl nozzle same as that in Example 4, solution A and solution B were fed at flow rates of 400 cm³/min.

Solutions A and B were sprayed as mists from the nozzle, mixed near the outlet and fell through the gas phase (air, temperature 50° C.). After a while the monomer particles floating near the nozzle adhered onto the nozzle outlet, caused a piece of polymer near the nozzle outlet and sealed off the nozzle, and the operation was made discontinued. As a result, it was impossible to yield water-absorbent composites such as those shown in Examples 1-4.

(Evaluation)

Each of the water-absorbent composites obtained in Examples 1-4 and Comparative Examples 1 and 2 was measured as followed.

1) Measurement of Average Minor Particle Diameter

An optical microscope was used to photograph multiple spots on the water-absorbent composite, 100 photographs of the granular aggregate were randomly selected, and the minor particle diameter of each of the particles was measured. The average measurement value was then calculated as the average minor particle diameter of the granular aggregate. Here, what is meant by "minor particle diameter" is the largest diameter perpendicular to the major, or longest, diameter of the particle.

2) Measurement of Capacity to Retain Physiological Saline

The water-absorbent composite was cut so that the weight W1 of the water-absorbent polymer on the water-absorbent composite was 1 g, put in a 250 mesh nylon bag (20×10 cm), and immersed for 30 minutes in 500 cm³ of physiological saline (concentration 0.9 weight percent) at room temperature. The nylon bag was then pulled out, suspended for 15 minutes to drip, and dewatered for 90 seconds at 90 G in a centrifuge. The dewatered nylon bag was then weighed W2. Nonwoven fabric that did not immobilize water-absorbent polymer was cut to the same size as the water-absorbent composite and processed to the same operation. Following dewatering, the fabric was weighed W3. The capacity to retain physiological saline was calculated with the following equation. Here, W1 through W3 are given in units of grams.

$$\text{Capacity to retain physiological saline} = (W2-W3)/W1$$

3) Calculation of Production Rate

The feed rate Ra of solution A to the outlet and the feed rate Rb of solution B to the outlet were calculated, the sum thereof was multiplied by the monomer concentration of 0.6 (60 percent), and this product was divided by the number n of pairs of outlets to calculate the production rate. The computation equation is given below.

In Examples 1 through 4 in which double concentric swirl nozzles were employed, the production rate per single nozzle consisting of an inner outlet and an outer outlet was calculated. In Comparative Examples 1 in which opposed nozzles were employed, and in Comparative Example 2 in which slit nozzles were employed, the production rate for a pair of nozzles was calculated.

$$\text{Production rate} = (Ra+Rb) \times 0.6/n$$

TABLE 1

| | | Example 1 | Example 2 | Example 3 | Example 4 | Comp. Ex. 1 | Comp. Ex. 2 | Comp. Ex. 3 |
|---|---|---|---|---|---|---|---|---|
| Outlet (a) | Nozzle type | Double concentric swirl nozzle | Double concentric swirl nozzle | Double concentric swirl nozzle | Double concentric swirl nozzle | Opposed nozzles | Slit nozzle | Double concentric swirl nozzle |
| | Outlet size (mm) | 1.0 diameter | 1.0 diameter | 1.0 diameter | 0.5 diameter | 0.13 diameter | 0.05 × length 1 | 0.5 diameter |
| | Inlet port area (mm²) | 0.80 | 0.80 | 0.80 | 0.24 | | | 0.24 |
| | Swirl chamber diameter (mm) | 5.0 | 5.0 | 5.0 | 3.0 | | | 3.0 |
| | Type of solution | B | B | A | B | B | B | B |
| | Flow rate (mL/m) | 300 | 400 | 400 | 200 | 20 | 150 | 400 |

TABLE 1-continued

|  |  | Example 1 | Example 2 | Example 3 | Example 4 | Comp. Ex. 1 | Comp. Ex. 2 | Comp. Ex. 3 |
|---|---|---|---|---|---|---|---|---|
|  | Injection pressure (inner) (MPa) | 0.5 | 0.8 | 0.5 | 2.4 | — | — | 8 |
|  | Thickness of liquid film (t) (mm) | 0.30 | 0.26 | 0.26 | 0.12 | — | — | 0.09 |
|  | Injection speed ($V_0$) (m/s) | 8.5 | 13 | 13 | 28 | — | — | 76 |
|  | Weber number (We1) | 504 | 1010 | 1010 | 2150 | — | — | 12400 |
|  | Reynolds number (Re1) | 2770 | 3700 | 3700 | 3700 | — | — | 7400 |
|  | $(We1) \times (Re1)^{0.5}$ | $2.65 \times 10^4$ | $6.14 \times 10^4$ | $6.14 \times 10^4$ | $1.31 \times 10^5$ | — | — | $1.07^6$ |
|  | $(We1)^{1.17} \times (Re1)^{0.33}$ | $1.99 \times 10^4$ | $4.92 \times 10^4$ | $4.92 \times 10^4$ | $1.19 \times 10^5$ | — | — | $1.16 \times 10^6$ |
|  | Spray state of solution A | Tulip-shaped liquid film | Tulip-shaped liquid film | Tulip-shaped liquid film | Mist | Fluid column | Flat liquid film | Mist |
| Outlet (b) | Nozzle type | Double concentric swirl nozzle | Double concentric swirl nozzle | Double concentric swirl nozzle | Double concentric swirl nozzle | Opposed nozzles | Slit nozzle | Double concentric swirl nozzle |
|  | Outlet size (mm) | 2.5 diameter | 2.5 diameter | 2.5 diameter | 1.2 diameter | 0.13 diameter | 0.05 × length 1 | 1.2 diameter |
|  | Inlet port area (mm$^2$) | 9.60 | 9.60 | 9.60 | 2.00 | — | — | 2.00 |
|  | Swirl chamber diameter (mm) | 12.0 | 12.0 | 12.0 | 8.0 | — | — | 8.0 |
|  | Type of solution | A | A | B | A | A | A | A |
|  | Flow rate (mL/m) | 300 | 400 | 400 | 200 | 20 | 150 | 400 |
|  | Injection pressure (inner) (MPa) | 0.2 | 0.2 | 0.2 | 0.6 | — | — | 8 |
|  | Thickness of liquid film (t) (mm) | 0.45 | 0.45 | 0.45 | 0.1 | — | — | 0.1 |
|  | Injection speed ($V_0$) (m/s) | 1.8 | 2.5 | 2.5 | 11 | — | — | 24 |
|  | Weber number (We2) | 34 | 64 | 64 | 275 | — | — | 1350 |
|  | Reynolds number (Re2) | 550 | 740 | 740 | 1200 | — | — | 2400 |
|  | $(We2) \times (Re2)^{0.5}$ | $7.89 \times 10^2$ | $1.75 \times 10^3$ | $1.75 \times 10^3$ | $9.45 \times 10^3$ | — | — | $6.56 \times 10^4$ |
|  | Spray state of solution B | Onion-shaped liquid film | Onion-shaped liquid film | Onion-shaped liquid film | Tulip-shaped liquid film | Fluid column | Flat liquid film | Mist |
| Evaluation | Average particle minor diameter (micrometers) | 500 | 350 | 500 | 300 | 550 | 700 | Stable operation not achieved, evaluation precluded |
|  | Water retention capacity (g/g) | 37 | 39 | 37 | 30 | 35 | 25 |  |
|  | Production rate (g/min) | 360 | 480 | 360 | 240 | 24 | 180 |  |

Note: When a double concentric swirl nozzle is employed, this denotes inner outlet for "Outlet (a)" and outer outlet for "Outlet (b)". When opposed nozzles and slit are employed, this denotes opposed nozzles for "Outlet (a)" and "Outlet (b)".
Note: When a double concentric swirl nozzle is employed, this outlet cross-section is ring-shaped, the "diameter" is the outer diameter, and the "width" is the width in the radial direction. When opposed nozzles are employed, the outlet cross-section is round and the diameter denotes the diameter of the circle.
Note: When a double concentric swirl nozzle is employed, the center of the cross section of injected liquid film of solution A matches the center of the cross section of injected liquid film of liquid B.

As is clear from Table 1, in the Examples conducted using the double concentric swirl nozzle with the conditions of the present invention, the efficient production of water-absorbent composite which has desirable particle diameter and high water retention capacity was possible. On the other hand, in Comparative Example 1, in which opposed nozzles were employed, production efficiency was low. Further, when slit nozzles were employed, the particle diameter and water retention capacity were poor.

Potential for Industrial Use

The present invention permits the efficient production of large quantities of high-quality polymer by the droplet polymerization method even using polymerizable monomers with rapid reaction rates. The present invention prevents a problem specifically encountered with slit nozzles, which is reduction of the width of the liquid film due to surface tension, and permits production of polymer which is more homogeneous. Further, employment of the nozzle in this invention permits the efficient production of high-quality polymer with a simple operation.

The invention claimed is:

1. A method of polymerization in which a first liquid and a second liquid are mixed in a gas phase and polymerized as droplets,
    wherein a polymerizable monomer and a polymerization initiator are each contained in at least one of said first liquid and said second liquid, and
    at least one of said first liquid and said second liquid is injected in a spatially expanding liquid film shape.

2. A method of polymerization according to claim 1, wherein at least one of said first liquid and said second liquid is injected with a velocity component coplanar with the injection surface.

3. A method of polymerization according to claim 1, wherein at least one of said first liquid and said second liquid is injected in a spatially expanding liquid film shape and a cross section of the injected liquid film comprises a curved section.

4. A method of polymerization according to claim 1, wherein at least one of said first liquid and said second liquid is injected in a spatially expanding liquid film shape and the cross section of the injected liquid film is a hollow circle.

5. A method of polymerization according to claim 4 wherein both said first liquid and said second liquid are injected in spatially expanding liquid film shapes and the cross sections of the injected liquid films are hollow circles.

6. A method of polymerization according to claim 5 wherein said first liquid and said second liquid is injected in such a manner that the hollow circle of the cross section of said first injected liquid film forms inside the hollow circle of the cross section of said second injected liquid film.

7. A method of polymerization according to claim 6 wherein the center of the hollow circle of the cross section of said first injected liquid film and the center of the hollow circle of the cross section of said second injected liquid film lie on the same axis.

8. A method of polymerization according to claim 4 wherein the injection is adjusted so that at least one of said first liquid film and said second liquid film flows along a tulip-shaped or onion-shaped path after the injection.

9. A method of polymerization according to claim 4 wherein the injection is adjusted so that both said first liquid film and said second liquid film flow along tulip-shaped or onion-shaped path after the injection.

10. The method of polymerization of claim 3 characterized by employing a nozzle that comprises a first round outlet for injecting the first liquid and a second round outlet for injecting the second liquid, wherein:

a first guide with round cross section is connected to the first round outlet and the first liquid is provided from a first inlet so as that the liquid forms a spiral flow on the inner wall of the first guide to the first round outlet;

a second guide with round cross section is connected to the second round outlet and the second liquid is provided from a second inlet so as that the second liquid forms another spiral flow on the inner wall of the second guide to the second round outlet;

and the first round outlet, the second round outlet, the first guide, and the second guide are arranged coaxially.

11. A method of polymerization according to claim 10 wherein the Weber number (We1) at said first round outlet and the Reynolds number (Re1) at said first guide satisfy the following conditions:

$$10{,}000 \leq (We1) \times (Re1)^{0.5}$$

$$(We1)^{1.17} \times (Re1)^{0.33} \leq 100{,}000.$$

12. A method of polymerization according to claim 10 wherein the Weber number (We2) at the second round outlet and the Reynolds number (Re2) at the second guide satisfy the following condition:

$$(We2) \times (Re2)^{0.5} \leq 40{,}000.$$

13. A method of polymerization according to claim 10 wherein the Weber number (We1) at the first round outlet and the Reynolds number (Re1) at the first guide satisfy the following conditions:

$$10{,}000 \leq (We1) \times (Re1)^{0.5}$$

$$(We1)^{1.17} \times (Re1)^{0.33} \leq 100{,}000$$

and the Weber number (We2) at the second round outlet and the Reynolds number (Re2) at the second guide desirably satisfy the following condition:

$$(We2) \times (Re2)^{0.5} \leq 40{,}000.$$

14. A method of polymerization according to claim 1 wherein the polymerization initiator is a redox-type polymerization initiator comprising an oxidizing agent and a reducing agent, and each of the polymerizable monomer, oxidizing agent and reducing agent is contained in at least one of said first liquid and said second liquid.

* * * * *